Patented Feb. 29, 1944

2,343,012

UNITED STATES PATENT OFFICE 2,343,012

PSEUDOTHIOHYDANTOIN-PROTEIN, DERIVATIVES, AND SOLUTIONS THEREFROM

Oskar Huppert, Chicago, Ill.

No Drawing. Application February 16, 1942,
Serial No. 431,082

19 Claims. (Cl. 106—153)

This application is a continuation in part of the one filed on July 11, 1941, Ser. No. 401,977.

My invention relates to a new process in the manufacture of sulphur containing protein products.

The present invention has particular reference to a process of manufacturing novel compounds which are formed by the reaction of the lower aliphatic alpha thiocyano acids with prolamines.

A particular object is the process for obtaining solutions and aqueous emulsions of these novel protein compounds and the production of their derivatives with aldehydes.

The invention comprises the novel products as well as the novel processes and steps of processes according to which such products are manufactured.

The invention differentiates from application Ser. No. 401,977 therein that the chemicals, the solutions, emulsions, the compounds with aldehydes are instantly prepared in an organic solvent.

The applicant has discovered, that the behaviour of zein by subjecting this prolamine to the action of thiocyano-acetic acid $$(NCS—CH_2—COOH)$$

is like that of aniline and it is assumed that the reaction involved may be in accordance with Jäger, Journal für praktische Chemie (2) 16, 18, and with Wheeler-Johnson, American Chemical Journal, 28, 121.

The novel compounds according to the present invention are presumedly derivatives of pseudothiohydantoin.

By assuming the Emil Fischer hypothesis as to the structure of the protein molecules viz.

$$NH_2—R—CO—(NH—R—CO)_x NH—R—COOH$$

and by substituting the radical $$—R—CO—(NH—R—CO)_x NH—R—COOH$$

per zein', the reaction may be illustrated by the following equations.

1. $NH_4CNS+ClCH_2—COOH = NCS—CH_2—COOH+NH_4Cl$
2. 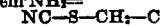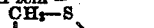$NCS—CH_2—COOH+zein'NH_2=$
   $NC—S—CH_2—CO—NH\ zein'+H_2O$
3. $NC—S—CH_2—CO—NH\ zein'=$

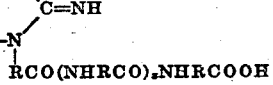

$$RCO(NHRCO)_x NHRCOOH$$

An outstanding effect of the zein-pseudothiohydantoin is the reaction with formaldehyde by room temperature. Ordinary solutions of zein react with formaldehyde very slowly even by higher temperatures. The reaction between pseudothiohydantoin derivatives with aldehydes is caused by the $CH_2$ group in the 5 position in the pseudothiohydantoin ring. The novel compounds are not sticky and therefore they offer a great advantage in the treatment of textiles. The solutions, respectively their emulsions with plasticizers as sulfonated castor oil and emulsifying agents such as alkali metal soaps are very useful in the manufacture of commercial soya wool and in improving casein filaments whereby in situ in the fibers the methylen pseudothiohydantoin zein is formed by the reaction with formaldehyde or other aldehydes. Furthermore the solutions of pseudothiohydantoin zein in aqueous alcohol represent a great improvement in the manufacture of a spinning solution for the manufacture of zein filaments, coatings, films, casings.

This invention employs as a base material a particular type of protein known as prolamines, especially prolamines as zein from corn, gliadin from wheat and hordein from barley. But other proteins such as gelatine may be used also. Instead of thiocyano acetic acid one can also use the lower alpha thiocyano aliphatic acids such as from propionic, butyric, succinic.

Instead of sulfonated castor oil other plasticizers such as esters of fatty acids and polyhydric alcohols, for example, monolinolein, monolaurin, monoricinolein or glycerylethers, for example, such as phenyl, benzyl, are also recommended.

As alkali metal soaps I prefer such as prepared from oleic, lauric, ricinoleic acid.

As aldehydes I prefer formaldehyde in aqueous solution or gaseous, but others such as glyoxal, furfural may be used. The following examples serve to illustrate the invention but are not intended to limit it therein, as well other proteins as prolamines may be transformed in pseudothiohydantoin derivatives.

*Example 1*

7.6 g. ammonium thiocyanate and 9.4 g. monochloroacetic acid are dissolved in 400 g. denaturated alcohol and then 100 g. zein are added under stirring. The solution is heated for a half hour. One obtains thus a clear solution of pseudothiohydantoin zein in alcohol.

*Example 2*

The solution, prepared and obtained as described in Example 1, is poured in a thin current in water. The pseudothiohydantoin zein is precipitated. Afterwards the precipitate is dissolved in 400 g. glycerolmonochlorhydrine by heating in a boiling water bath.

Example 3

7.6 g. ammonium thiocyanate and 9.4 g. monochloroacetic acid are dissolved in alpha monochlorhydrine by heating in a boiling water bath. Now 100 g. zein are added and the mixture is heated under stirring again for two hours. One obtains thus a clear solution of pseudothiohydantoin zein in monochlorhydrine.

For the chemical in this solution I have nominated in abbreviation the name "Protonol."

Example 4

The solution, prepared and obtained as described in Example 1, is mixed with 2 to 10 cc. formaldehyde 37%. The resulting mixture may be extruded as a film or filament or coated into a surface so that on drying the desired formation of methylene-pseudothiohydantoin zein takes place.

Example 5

400 cc. (533 g.) of the solution, prepared and obtained as described in Example 3, are mixed with 67 g. sulfonated castor oil.

Example 6

400 cc. (533 g.) of the solution, prepared and obtained as described in Example 3, are mixed with 67 g. sulfonated castor oil. To one part of the mixture are added two parts of a 5% aqueous solution of sodium oleate. The emulsion thus obtained is then diluted with 28 parts of water (the parts are by volume). For this diluted emulsion I have nominated the name "Protonol emulsion."

Example 7

The diluted emulsion (Protonol emulsion) prepared and obtained as described in Example 6, is poured in diluted acid, such as 1% acid sulfuric. The precipitate is separated and treated with a solution of 4% formaldehyde, 10% sodium chloride or gaseous formaldehyde.

Example 8

The solution, prepared and obtained as described in Example 1, is poured in a precipitating bath containing 500 cc. water, 100 g. acid sulfuric and 65 cc. formaldehyde 37%, 75 g. sodium sulfate.

Example 9

The solution, prepared and obtained as described in Example 1 is mixed with 10 cc. formaldehyde 37%. After a short time (five minutes), the tanning reaction takes place. The protein plastic is subsequently immersed in a coagulating bath, containing 400 cc. water, 25 g. acid sulfuric, 60 g. sodium sulfate.

Example 10

400 g. wheat flour is mixed with 450 cc. 70% alcohol for four hours. The suspension is filtered. In the filtrate are dissolved 7.6 g. ammonium thiocyanate and 9.4 g. monochloro-acetic acid. Then the mixture is heated for a half hour in a boiling water bath. One obtains thus a clear solution of pseudothiohydantoin gliadin in alcohol.

It will be understood that the detailed procedures described are capable of wide variations and modifications without departing from the spirit of this invention.

Having now particularly described and ascertained the nature of my invention and in what manner the same is to be performed, I declare that what I claim is:

1. Process for the production of prolamine derivatives of pseudothiohydantoin which comprises mixing together a lower aliphatic alpha thiocyano acid and a prolamine in a halogenated polyhydric alcohol, heating the mixture.

2. Process for the production of the zein derivative of pseudothiohydantoin which comprises mixing together monochloroacetic acid, ammonium thiocyanate and zein in aqueous alcohol not in excess of 30% water, heating the mixture.

3. Process for the production of the zein derivative of pseudothiohydantoin which comprises mixing together monochloroacetic acid, ammonium thiocyanate, glycerol-monochlorhydrine and zein, heating the mixture.

4. Process for the production of protein derivatives of pseudothiohydantoin which comprises mixing together a lower aliphatic alpha thiocyano acid and a protein in water, heating the mixture.

5. Process for the production of the gelatine derivative of pseudothiohydantoin which comprises mixing together monochloroacetic acid, ammoniumthiocyanate and gelatine, dissolved in water, heating the mixture.

6. Process for obtaining an emulsion of the prolamine derivative of pseudothiohydantoin which comprises mixing the solution, obtained by causing to react a prolamine with the lower aliphatic alpha thiocyano acids in a halogenated polyhydric alcohol, with alkali metal soap as an emulsifying agent.

7. Process for obtaining an aqueous emulsion of the prolamine derivative of pseudothiohydantoin which comprises mixing the solution, obtained by causing to react a prolamine with the lower aliphatic alpha thiocyano acids in a halogenated polyhydric alcohol, with a plasticizer and alkali metal soap as an emulsifying agent and diluting the emulsion with water.

8. Process for obtaining an emulsion of the zein derivative of pseudothiohydantoin which comprises mixing the solution, obtained by causing to react zein with a solution of monochloroacetic acid and ammonium thiocyanate in glycerolmonochlorhydrine, with sulfonated castor oil and emulsifying the mixture with an aqueous solution of alkali metal soap.

9. As an article of manufacture a sulphur containing derivative of a protein, having the formula:

$$\begin{array}{c} R_1CH-S \\ | \quad\quad\quad \diagdown \\ \quad\quad\quad\quad C=NH \\ | \quad\quad\quad \diagup \\ CO-N \\ \quad\quad | \\ \quad\quad R-CO-(NH-R-CO)_x-NH-R-COOH \end{array}$$

wherein $R_1$ denotes the alkyl radical of the lower aliphatic alpha thiocyano acids and $x$ represents an unknown number of polymers of molecular units of a protein.

10. As an article of manufacture a solution of zein-pseudothiohydantoin in glycerol monochlorhydrine with sulfonated castor oil.

11. As an article of manufacture a composition useful in the manufacture of commercial soya filaments and improved casein filaments consisting of zein-pseudothiohydantoin, glycerolmonochlorhydrine, sulfonated castor oil, sodium oleate and water.

12. As an article of manufacture a composition useful in the manufacture of protein filaments consisting of gelatine-pseudothiohydantoin and water.

13. As an article of manufacture a sulphur containing derivative of a protein, having the formula:

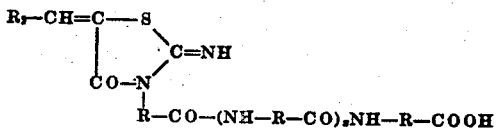

R—CO—(NH—R—CO)$_x$NH—R—COOH wherein $R_2$ denotes the radical of a member selected of the class of aldehydes and $x$ represents an unknown number of polymers of molecular units of a protein.

14. As an article of manufacture the methylene compound of pseudothiohydantoin zein.

15. As an article of manufacture the methylene compound of pseudothiohydantoin gelatine.

16. Process for obtaining an aqueous emulsion of the zein derivative of pseudothiohydantoin which comprises mixing the solution, obtained by causing to react zein with a solution of monochloroacetic acid and ammonium thiocyanate in glycerol-monochlorhydrine, with sulfonated castor oil, emulsifying the mixture with an aqueous solution of sodium oleate and diluting the emulsion with water.

17. Process for the production of a protein derivative of pseudothiohydantoin and an aldehyde, which comprises forming an emulsion consisting of the protein derivative, a plasticizer, an alkali metal soap, and water and precipitating the protein pseudothiohydantoin with an aldehyde.

18. Process for the production of a zein derivative of pseudothiohydantoin and formaldehyde, which comprises forming an emulsion consisting of zein pseudothiohydantoin, sulfonated castor oil, sodium oleate and water and precipitating the zein pseudothiohydantoin with formaldehyde in presence of acid sulfuric.

19. Process for the production of a zein derivative of pseudothiohydantoin and formaldehyde, which comprises forming an emulsion consisting of zein pseudothiohydantoin, dissolved in glycerol monochlorhydrine, sulfonated castor oil, sodium oleate and water and precipitating the zein pseudothiohydantoin with formaldehyde in presence of acid sulfuric.

OSKAR HUPPERT.